(12) United States Patent
Dornbos

(10) Patent No.: US 7,290,783 B2
(45) Date of Patent: Nov. 6, 2007

(54) TOWING APPARATUS WITH ENERGY ABSORBER

(75) Inventor: Robert J. Dornbos, Hudsonville, MI (US)

(73) Assignee: Shape Corporation, Grand Haven, MI (US)

( * ) Notice: Subject to any disclaimer, the term of this patent is extended or adjusted under 35 U.S.C. 154(b) by 354 days.

(21) Appl. No.: 10/940,134

(22) Filed: Sep. 14, 2004

(65) Prior Publication Data

US 2005/0110240 A1 May 26, 2005

Related U.S. Application Data

(60) Provisional application No. 60/524,247, filed on Nov. 21, 2003.

(51) Int. Cl.
*B60D 1/48* (2006.01)
(52) U.S. Cl. .................................. 280/495; 280/486
(58) Field of Classification Search ............... 280/495, 280/496, 491.4, 486; 293/133
See application file for complete search history.

(56) References Cited

U.S. PATENT DOCUMENTS

| | | | |
|---|---|---|---|
| 2,513,932 A | 7/1950 | Grube | |
| 2,783,039 A | 2/1957 | Wilson | |
| 3,838,872 A | 10/1974 | Fullhart | |
| 3,868,098 A | 2/1975 | Coombs | |
| 3,904,226 A | 9/1975 | Smalley | |
| 3,990,722 A | 11/1976 | Casad et al. | |
| 4,027,893 A | 6/1977 | Drudge | |
| 4,382,609 A | 5/1983 | Hemmings | |
| 4,431,212 A | 2/1984 | Hirabayashi et al. | |
| 4,468,052 A | 8/1984 | Koike | |
| 4,610,458 A | 9/1986 | Garnham | |
| 5,054,806 A | 10/1991 | Chester | |
| 6,179,320 B1 | 1/2001 | Chou et al. | |
| 6,199,924 B1 | 3/2001 | Oguri et al. | |
| 6,250,664 B1 | 6/2001 | Tetrick | |
| 6,382,654 B1 | 5/2002 | Mahncke | |
| 6,502,848 B1 | 1/2003 | Chou et al. | |
| 6,581,955 B2 | 6/2003 | Aquinto et al. | |
| 6,648,384 B2 | 11/2003 | Nees et al. | |
| 6,648,385 B2 | 11/2003 | Frank | |
| 6,655,721 B2 | 12/2003 | Hagen | |
| 6,659,518 B2 | 12/2003 | Ponsonnaille et al. | |
| 2002/0053782 A1 | 5/2002 | Peters | |
| 2002/0105163 A1 | 8/2002 | Pierman et al. | |

(Continued)

FOREIGN PATENT DOCUMENTS

DE        004115812        11/1991

(Continued)

*Primary Examiner*—Tony Winner
(74) *Attorney, Agent, or Firm*—Price, Heneveld, Cooper, DeWitt, & Litton LLP

(57) ABSTRACT

A towing apparatus mounted to a frame of a vehicle includes a receiver and an energy management device. The receiver is operably connected to the energy management device and the energy management device is operably connected to the vehicle frame. When the receiver is moved in a first tow direction, the energy management device is isolated and the tow force is coupled directly to the frame. However, when the energy management device is moved in a second, generally opposite direction, the energy management device reduces some or all of the force applied to the receiver from being transferred to the vehicle frame.

23 Claims, 8 Drawing Sheets

U.S. PATENT DOCUMENTS

2003/0057720 A1 3/2003 Nees et al.
2003/0127829 A1 7/2003 Tomita
2003/0209915 A1 11/2003 Yoshida
2003/0218341 A1 11/2003 Jonsson et al.

FOREIGN PATENT DOCUMENTS

JP   9277811    10/1997
JP   2001063498  3/2001

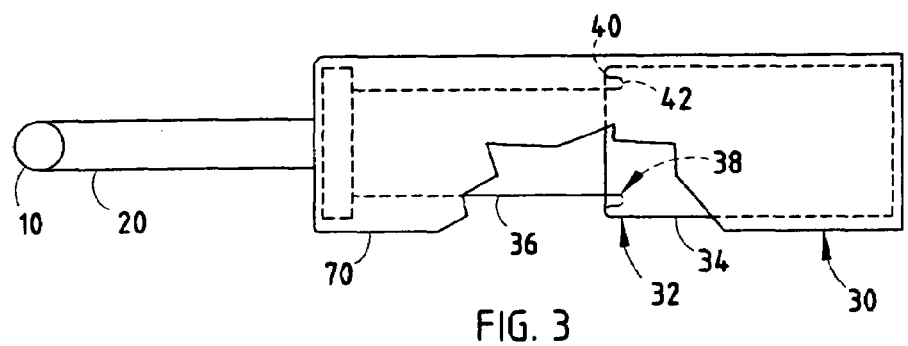
FIG. 3
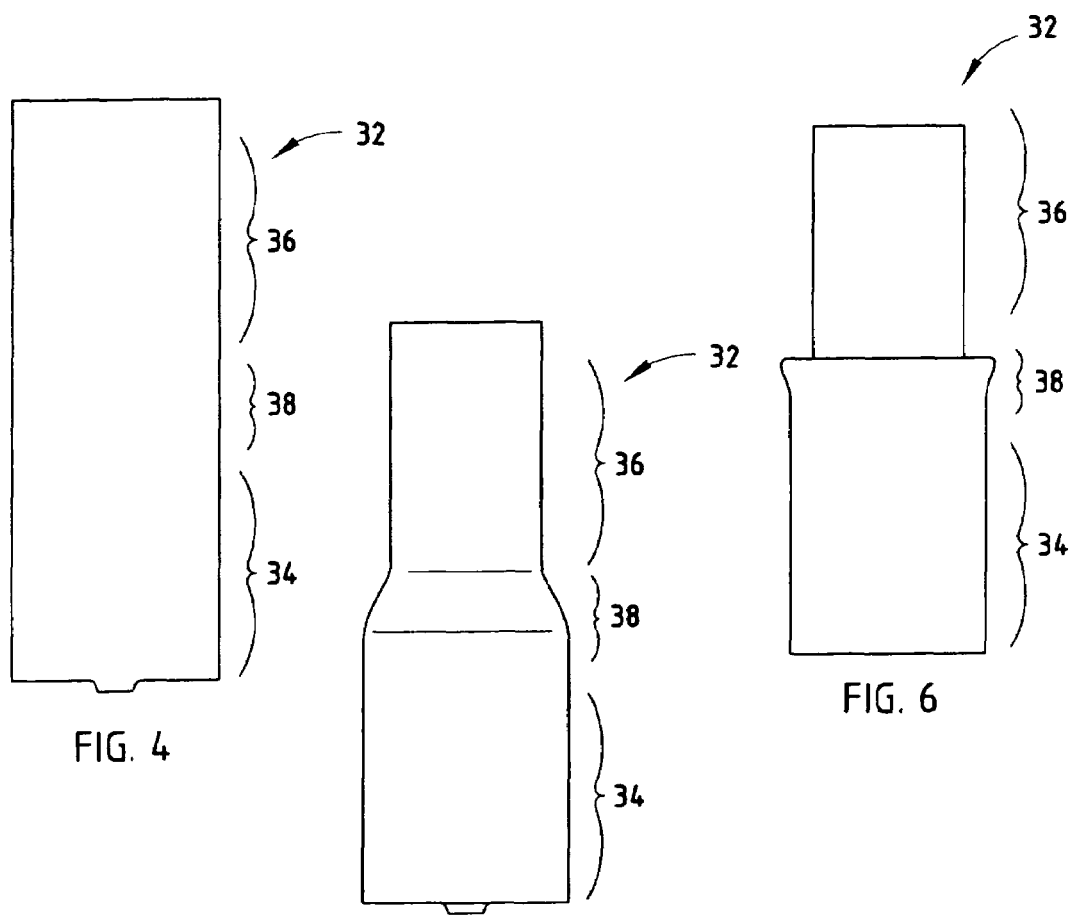
FIG. 4
FIG. 5
FIG. 6

TOWING APPARATUS WITH ENERGY ABSORBER

CROSS REFERENCE TO RELATED APPLICATION

This application claims the benefit of U.S. Provisional Application No. 60/524,247, filed Nov. 21, 2003, entitled TOWING APPARATUS WITH ENERGY ABSORBER, which is hereby incorporated herein by reference in its entirety.

BACKGROUND OF THE INVENTION

The present invention relates to a towing apparatus generally, and more particularly to a towing apparatus which is connected to a vehicle frame.

In many of today's vehicles, a hook, loop, clasp or other receptacle is affixed to the vehicle's frame in such a manner as to protrude from the front or rear bumper of the vehicle. These receptacles are commonly known as tow hooks and are used to permit easier attachment of a towing vehicle to a towed vehicle. For example, when a vehicle is being towed or pulled, tow hooks provide a convenient location for the towing vehicle to hook its receiver. This is a vast improvement over the prior method of having to hook to the vehicle through the vehicle frame which is relatively inaccessible. This is especially true if the vehicle is in a ditch or other situation where the frame may be partially or completely inaccessible.

Typically, tow hooks are mounted either directly or indirectly to the vehicle's frame. This method of attachment is required as the frame is the only part of the vehicle which is strong enough to sustain the pulling forces which are generated without damaging the vehicle. Most commonly, tow hooks are either attached directly to the vehicle frame, or to the front or rear bumper which is attached to the frame. However, the preferred method of attachment is directly to the frame as this yields the most rigid and durable connection point.

The tow hooks must be disposed at either the front or rear of the vehicle to allow for towing. Additionally, these hooks will routinely project from these front or rear surfaces to allow for ease of access. One problem that has arisen with the location and method of attachment of these tow hooks has been when the vehicle encounters a minor impact force, such as occurs during standardized impact testing which the vehicle bumper system must pass.

In today's vehicles, when a bumper encounters an obstruction, the force is not transmitted directly to the frame but rather is dampened through various means such as crush towers. These dampening features dissipate some of the impact force before it is transmitted to the occupants of the vehicle via the frame rail. However, this is not the case with today's tow hooks. When the front or rear of a vehicle encounters an obstruction, such that the obstruction encounters the tow hook, the force is transmitted directly to the vehicle's frame and therefore, directly to the vehicle's occupants. This results in at least two problems. The first is the safety concern for the vehicle occupants because the full force of the impact is transmitted directly to the occupants and the second is the resulting damage which can occur to the vehicle frame. Because the tow hook is coupled directly to the frame, even a minor impact can damage the frame resulting in expensive structural repair costs.

Accordingly, a tow hook is desired solving the aforementioned problems and having the aforementioned advantages. In particular, a tow hook is desired that incorporates an energy management system which can reduce the amount of force transmitted by the tow hook to the vehicle frame during an impact while simultaneously allowing for the rigid connection that is required in order to use the tow hook for towing or pulling the vehicle.

SUMMARY OF THE INVENTION

One aspect of the present invention is to provide a towing apparatus which is adapted for mounting to a frame of an automotive vehicle and includes a receiver adapted to receive a towing force, and an energy management device which is operably connected to the receiver. The energy management device is adapted for connection to a vehicle frame so that when the receiver is subjected to a first force in a first tow direction, the first tow force is directly transferred to the vehicle frame, and when the receiver is subjected to a second force of predetermined magnitude in a second direction, the energy management device yields and reduces the second force to a reduced third force, which is in turn transferred to the vehicle frame.

Another aspect of the present invention is to provide a towing apparatus which is adapted for mounting to a frame of a vehicle and includes a receiver. An energy damping device having a first end is operably connected to the receiver and is adapted for connection to a vehicle frame so that when the receiver is subjected to a first force of predetermined magnitude in a first direction, the energy damping device reduces the magnitude of the first force which is transmitted to the vehicle frame, and when the receiver is subjected to a second force in a second direction, the energy damping device does not reduce the second force transmitted to the vehicle frame.

Yet another aspect of the present invention is to provide an apparatus including a towing hook, a vehicle mount and a crushable, collapsible energy management tube which connects the towing hook and the vehicle mount and that is constructed of a material adapted to consistently and predictably absorb energy via a telescoping collapse upon receiving an impact.

These and other features, advantages and objects of the present invention will be further understood and appreciated by those skilled in the art by reference to the following specification, claims and appended drawings.

BRIEF DESCRIPTION OF THE DRAWINGS

FIG. 3 is a partial sectional plan view of the tow hook and energy management device of FIG. 2, the energy management device shown with a cutaway section;

FIGS. 4-6 are side views of a tubular blank with a first diameter (FIG. 4), the tubular blank being compressed to a reduced diameter at one end (FIG. 5) and then deformed longitudinally at an intermediate tube section to take on an S-shaped pre-set (FIG. 6), wherein FIG. 6 illustrates an energy management tube of the present invention;

DETAILED DESCRIPTION OF THE PREFERRED EMBODIMENT

Figure 1:
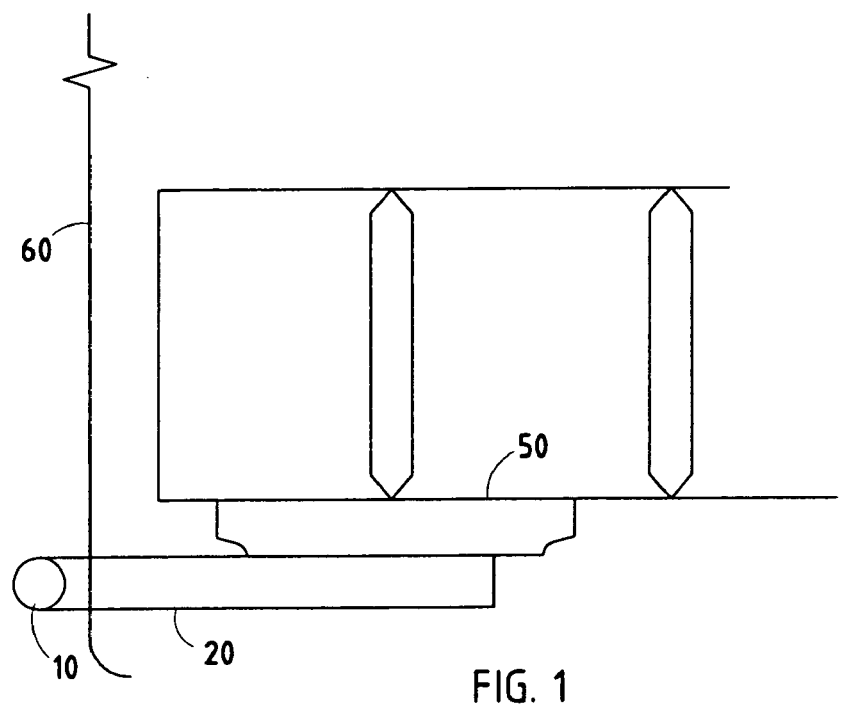
FIG. 1 is a partial sectional plan view of a tow hook mounted to a vehicle frame in the prior art.

The reference numeral 2 (FIG. 2) generally designates a towing apparatus and energy management device embodying the present invention. Such a towing apparatus may be used, for example, in the front or rear of a vehicle to provide ready access to an area of the vehicle which may be used for towing or pulling the vehicle.

Figure 2:
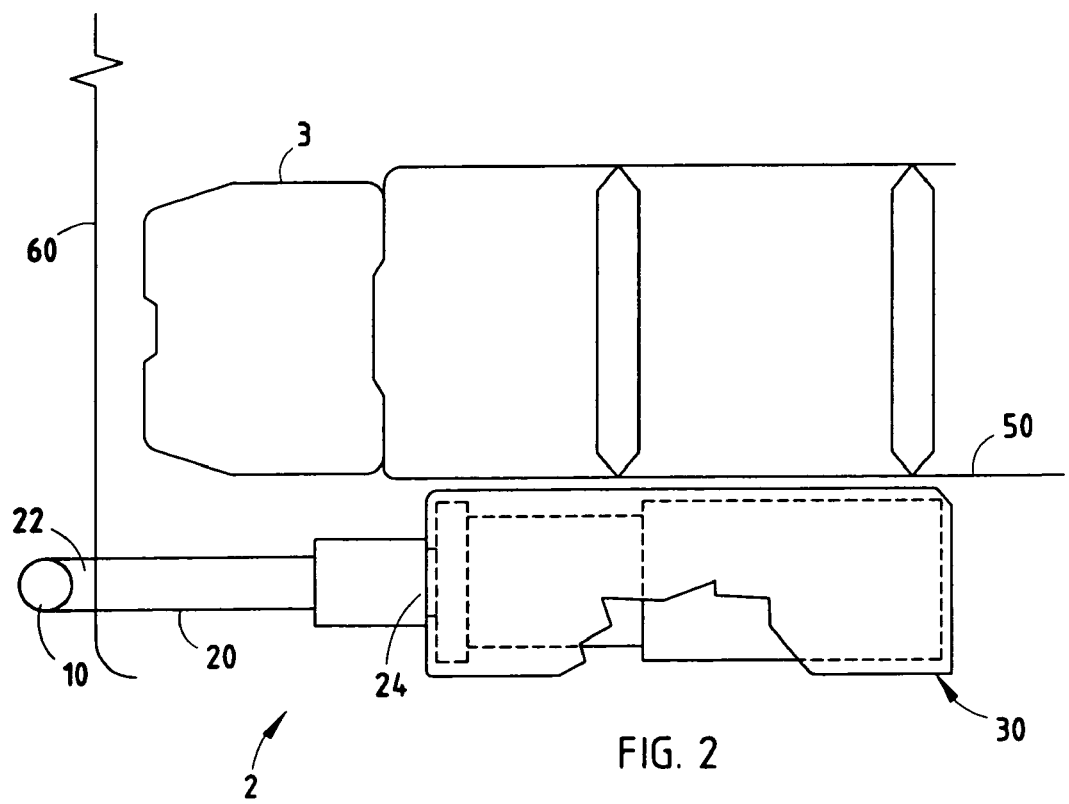
FIG. 2 is a partial sectional plan view of a tow hook and an energy management device mounted to a vehicle frame embodying the present invention, the energy management device shown with a cutaway section.
Figure 7:
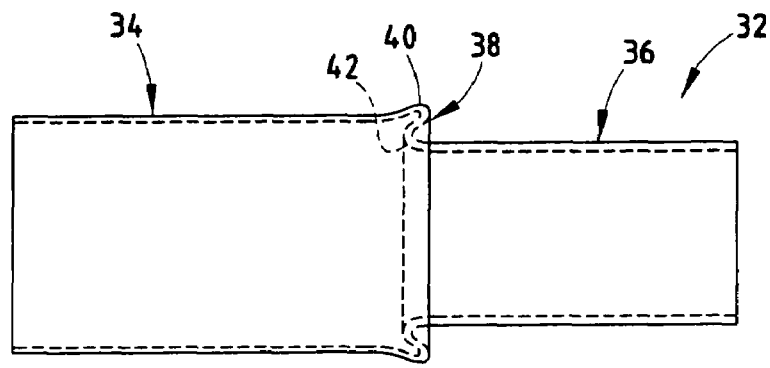
FIGS. 7-9 are side, longitudinal cross-sectional, and end views of the tube of FIG. 6.

In the illustrated example, towing apparatus 2 generally includes a receiver 10 which is used to facilitate and provide a connection point to the vehicle by which the vehicle may be towed or otherwise moved. A shaft 20 connects receiver 10 to energy management device 30. Energy management device 30 is used to provide a connection by which receiver 10 is directly connected to a frame 50 of a vehicle when receiver 10 is used in the capacity as a towing hook. However, energy management device 30 is used to decouple this direct relationship between receiver 10 and frame 50 when receiver 10 is involved in an impact or otherwise moved in a direction opposite to the towing direction. Energy management device 30 is directly, and typically rigidly, connected to frame 50 thereby providing the direct relationship between receiver 10 and frame 50 when required. For illustrative purposes, receiver 10 is shown in FIG. 2 as extending from a front bumper of a vehicle 60. However, receiver 10 could also be mounted to the rear of a vehicle (not shown).

Receiver 10 is used as an attachment point to permit the towing or pulling of an otherwise inoperable vehicle. Since the entire pulling weight of the vehicle is transmitted through the receiver when the vehicle is pulled, prior art receivers are typically mounted directly to the vehicle frame rail 50 as shown in FIG. 1. This direct connection to frame 50 is required because other, weaker parts of the vehicle would incur damage due to the large forces which are developed and transmitted during the towing of a vehicle. However, this direct connection can be problematic when the force on the receiver and corresponding shaft exceed the mechanical limits of either the attachment point of the towing apparatus to frame 50, or the frame rail itself. If the forces on the towing apparatus exceed these mechanical limits, damage to the frame can occur, imposing significant safety issues as well as corresponding costs to the vehicle owner.

Towing apparatus 2 embodying the present invention overcomes these disadvantages by coupling the towing force on receiver 10 directly to frame 50. Additionally, if the receiver is subjected to a force in an opposite direction to a towing force, such as during an impact, the energy management device 30 is not directly coupled to frame 50, thereby allowing the energy management device to yield before the mechanical limits of the frame are exceeded.

Receiver 10 is used to provide a connection point to an otherwise inoperable vehicle in order to allow the vehicle to be towed or pulled. Receiver 10 is not critical to the inventive concept and may take the form of any type of connection. For example, receiver 10 may be a hitch ball, tow hook, pintle hook, or other generally well known coupler. However, this is not meant to be limiting in any manner and any connection type and method may be used. Receiver 10 is connected to energy management device 30 in any manner meeting the specific needs of the design. For example, receiver 10 could be coupled to energy management device 30 through its own coupler arrangement, by mechanical fasteners, welding or by any other generally well known method. In a preferred embodiment, receiver 10 is disposed or otherwise affixed to a first end 22 of shaft 20 wherein a second end 24 is disposed or otherwise operably connected to energy management device 30. The connections between receiver 10 and first end 22, as well as the connections between second end 24 and energy management device 30 are not critical to the inventive concept and may use a connection and/or a method which is generally well known in the art.

Energy management device 30 may take various forms. However, in all embodiments, energy management device 30 is used to provide a coupling relationship between receiver 10 and frame 50. In a preferred embodiment, energy management device 30 allows the forces which occur during towing, on receiver 10, to be directly transmitted to frame rail 50. These forces which occur during the towing of a vehicle are generally controlled and well within the mechanical limits of the frame rail. This is primarily due to the fact that the towing operation does not occur in an uncontrolled state. Rather, as is typically the case, either a tow truck or a winch is used to supply the corresponding towing force and these forces are typically kept well within the mechanical limits of the frame rail. However, in certain situations the receiver can be subjected to forces which exceed the mechanical limits of the frame rail; namely, during an impact of the vehicle. For example, the federal government requires that all vehicles must be subjected to a 5 mph bumper impact while remaining structurally sound. Therefore, today's vehicles typically have what is referred to as crush towers (3) separating the bumper from the frame. The crush towers 3 act like energy absorbers and reduce the force of the impact by isolating the force which develops on the front bumper from the frame rail. However, many of today's vehicles also include tow hooks at these bumper locations. Because these tow hooks need to be accessible, they may be only slightly recessed behind the bumper; in some cases they may even protrude. Therefore, when the vehicle is subjected to an impact, if any of the impact force is transferred to the receiver 10 of the towing apparatus, the force is directly communicated to the frame rail 50 rather than having the force dampened by crush towers 3. Therefore, even in minor impacts significant safety issues and damage can occur through the use of these tow hooks. By using energy management device 30 to separate, reduce and/or remove this impact force from being transmitted to the frame, the safety of the vehicle is increased while the cost of repairs may be significantly reduced. In the preferred embodiments, three different energy management devices will be discussed as well as a novel attachment device which may be used with the aforementioned energy management devices.

A first embodiment is shown in FIG. 3, wherein energy management device 30 includes crush tower or energy management tube 32. Management tube 32 is further defined by a first tube section 34, a second tube section 36 which is aligned with the first tube section, and an intermediate tube section 38 with first and second end portions 40 and 42, respectively. The end portions 40 and 42 integrally connect the first and second tube sections 34 and 36, respectively. The first tube section 34 is dimensionally larger in size than second tube section 36 and has a similar cylindrical cross-sectional shape. However, it is noted that first and second tube sections 34 and 36 can be different shapes including rectangular, square, oval, round, or other geometric shapes. Further, it is contemplated that tube sections 34 and 36 may have different cross-sectional shapes along their lengths, especially at locations spaced away from the intermediate tube section 38. The intermediate tube section 38 has a shape transitioning from the first tube section 34 to the second tube section 36, and further the first and second end portions 40 and 42 are dissimilar in shape as noted below. These and other features of the energy management tube are discussed in a copending U.S. Patent Application entitled TUBULAR ENERGY MANAGEMENT SYSTEM FOR ABSORBING IMPACT ENERGY, filed on Aug. 26, 2003 which is wholly incorporated herein by reference.

Energy management tube 32 may be made from a sheet of annealed steel material with each of the tube sections 34, 36 and 38 being integrally formed together as a unit. The wall thickness can be varied as needed to satisfy functional design requirements. For example, the thickness can be about 1.5 mm to 4 mm, depending on material strengths and the specific application requirements of use. It is contemplated that the sheet will initially be made into a continuous long tube by a roll-forming machine, and thereafter cut into tubular blanks of predetermined length (FIG. 4). Then, the tubular blanks will have the areas of tube sections 36 and 38 annealed and then formed into a shape (FIG. 5) where the second tube section 36 is compressed to a reduced diameter, wherein the intermediate section 38 temporarily takes on a frusto-conical shape. It has been determined that it is beneficial to fixture and longitudinally deform energy management tube 32 to a preset condition (FIG. 6), so that the intermediate section 38 takes on a particular shape that avoids high/low spikes during initial impact, as noted below. For a towing apparatus with an energy management system, it is preferable that the sheet of material be a good, reliable grade of steel, such as structural steel. Steels having greater than about 35 KSI yield strength work very well. Steels that can be heat treated or annealed to achieve optimal yield and elongation properties in selected areas are also excellent candidates, such as structural steels, or high strength low alloy steels (HSLAS) or ultra high strength steel (UHSS).

A specific comment about materials is appropriate. As selected materials get stronger and harder, with higher yield strengths, higher tensile strengths and lower elongation values, they often become more sensitive to tight radii and will tend to resist rolling. Instead, they will tend to break, kink, shear, crack, and/or fracture. This breaking problem gets worse as the radii approach a thickness dimension of the material. The present invention utilizes outward and inward flaring, clearances, and radii specifically chosen to help deal with this problem. Various grades of steel are known in the art and understood by skilled artisans. The reader's attention is directed to ASTM A1008/A and A1008M-01*a*, and also to ASTM A1011A and A1011M-01*a* for standardized industry definitions. Structural steels such as steels having about 25 KSI and above have strength properties where the quality problems noted above begin to occur. Structural steels are typically a slightly better grade than cold rolled commercial quality steel or hot-rolled commercial quality steel. Nonetheless, especially as they approach 25 to 35 KSI tensile strength, they tend to have problems. It is specifically contemplated that the present invention will work well using structural steels, such as steels having a tensile strength of about 25 KSI or greater. The present invention also is well adapted for and works well for stronger materials of 80 KSI and above, and ultra-high-strength steels (UHSS). Where workability and enhanced rolling of material is desired, these steels can be heat treated or annealed to achieve optimal properties at strategic regions along the energy management tubes.

It is noted that the various steels discussed herein are intended to be and are believed to be well understood by persons skilled in the art of steel materials and in the art of roll-forming. For the reader's benefit, it is noted that additional information can be obtained from the American Society for Testing and Materials (ASTM). The terms for steels as used herein are intended to be consistent with ASTM standards and definitions. Nonetheless, it is emphasized that the present technology is very flexible and adaptable to work with a wide variety of materials. Accordingly, the various terms are intended to be broadly construed, though reasonably construed.

The present concepts are believed to be particularly useful for HSLA steels, and ultra-high-strength steels (UHSS), such as dual phase steel, tri phase (TRIP) steel, or martensitic materials. The present concepts are also useful for other engineering grade materials, such as aluminum and even softer materials. The present concepts are particularly useful where high strength materials permit weight reduction through reduced wall thicknesses (i.e. gauge reduction). By being heat treatable, the material is inherently more workable and flowable, and/or can be made more workable and flowable in selected areas. For example, this allows a pre-set to be formed in the intermediate tube section 38 with small radii, yet with less risk of developing micro-cracks and/or macro-cracks and/or splitting, less risk of shearing problems and material separation such as shelving, and less risk of other quality defects causing reduced material strength in the area of small-radius bends. The property of being annealed also allows the material to roll without shearing, ripping, or tearing, which is important in achieving maximum energy absorption during impact and longitudinal crush (See FIG. 11).

Notably, performance of the present energy management tube can be adjusted and tuned to meet specific criteria by numerous methods, including by adjustment of the following variables: material thickness, material type, material hardness and yieldability, annealing temperatures and conditions, tube diameter and shapes, the particular rolling radius design and the degree of pre-set, use of crushable inserts positioned within (or outside) the tube sections, and other factors affecting rolling of material, columnar strength, energy absorption, and distribution of stress during a longitudinal crushing impact.

Figure 8:
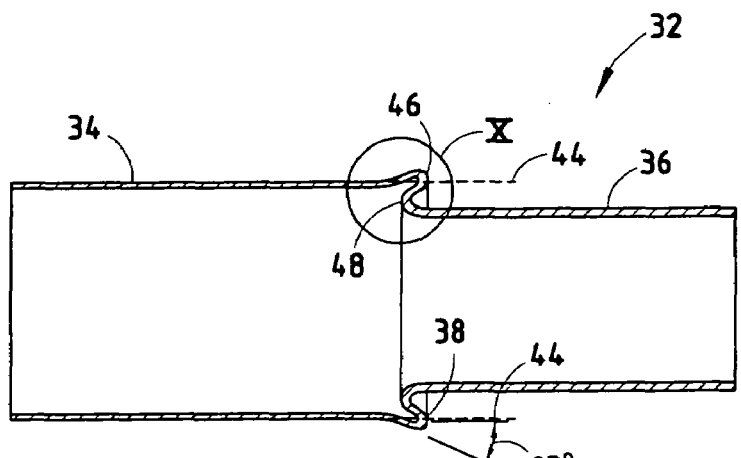
Figure 9:
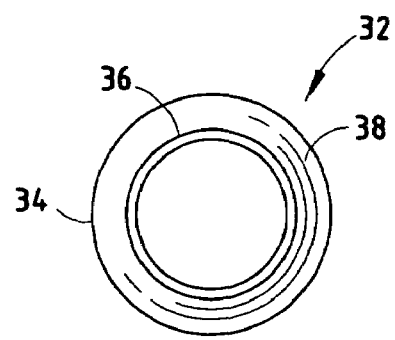
Figure 10:
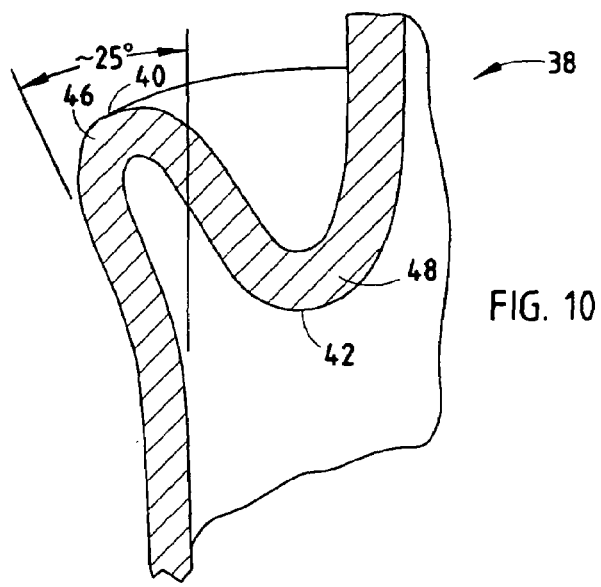
FIG. 10 is an enlarged partial sectional view of the circled area X in FIG. 8.

As illustrated in FIGS. 7-10, the first tube section 34 is larger in size than the second tube section 36. The first tube section 34 includes an outer surface defining a tubular boundary 44. The tubular boundary 44 matches a cross-sectional shape of the first tube section 34 at an area near the first end portion 40 (FIG. 8). The first end portion 40 includes a circumferentially-continuous band of tightly deformed material 46 that is flared outward radially beyond the boundary 44, such as at a minimum angle of about 25° (FIG. 10). This tightly deformed material 46 defines a small radius that effectively forms a "pinched" area that resists rolling of the material. Also, there is some work hardening of the material at the small radius. The small radius (on its concave surface) is preferably not less than about 0.5 times a thickness of the material of the first end portion 40. Thus, it adequately resists a tendency to shear or crack. The reasons for the deformed material 46 resisting rolling are numerous and subtle. It is believed that the tight "small" radius along with the flared shape forms a uniform ringed support for the first tube section 34 that acts to support and maintain a columnar strength of the first tube section upon longitudinal impact. When longitudinally stressed, the tightly deformed material 46 resists rolling of the material of first end portion 40 and of the first tube section 34.

Figure 11:
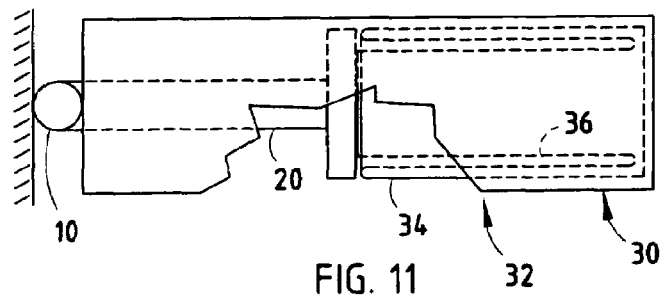
FIG. 11 is a partial sectional plan view of the tow hook and energy management device of FIG. 3 in a compressed state, the energy management device shown with a cutaway section.

Contrastingly, the second end portion 42 (FIG. 10) has a deformed material 48 defining a relatively larger radius (on its concave surface), such as at least about 1.0 times a thickness of the material of the second end portion 42. The deformed portion 48 of the second end portion 42, due to its larger radius, is less resistant to rolling of the material of the second tube section 36 and is less supportive of the columnar strength of the second tube section 36. In fact, second end portion 42 is configured to initiate a telescoping rolling of the second tube section 36 during impact as the first tube section 34 maintains its columnar strength (FIG. 11). The fact that the tube sections 36 and 38 are annealed, and the first tube section 34 is not annealed, further facilitates and causes this result (although annealing is not required to have a tendency of a material to roll). Clearances are provided for the flow of material as necessary as it rolls. Potentially, the tube sections 34 and 36 can be sized to provide support to each other during the rolling of material during an impact. The pre-set condition of the intermediate tube section 38 also is important since it helps avoid an initial sharp high load peak, such that the load quickly levels off as it reaches a predetermined initial level, and then remains at that level during the impact stroke (see FIG. 12).

Figure 13:
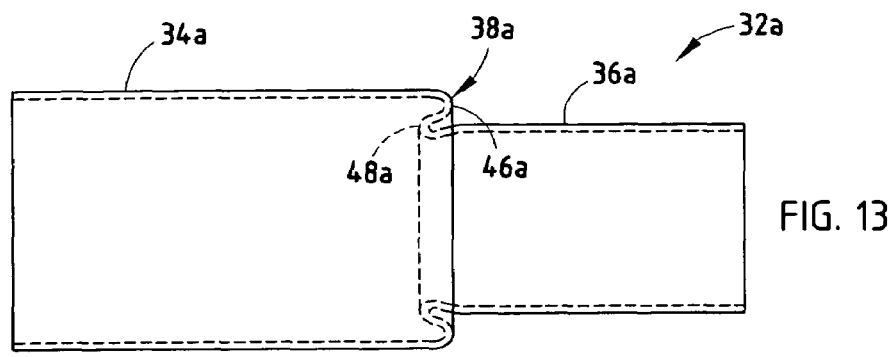
FIGS. 13 and 14 are side and longitudinal cross-sectional views, respectively, of a modified energy management tube.
Figure 14:
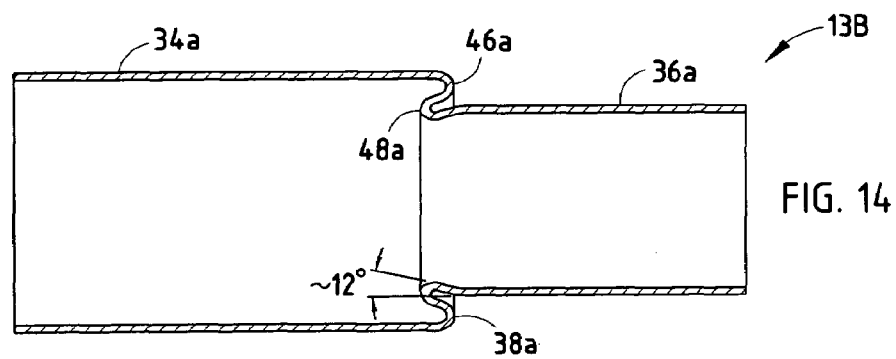

A second energy management tube 32a (FIGS. 13-15) includes a first tube section 34a, a second tube section 36a, and an intermediate tube section 38a interconnecting the tube sections 34a and 36a. However, tube 32a differs from tube 32. In tube 32a, the end portion 40a of the larger-diameter first tube section 34a includes deformed portion 46a defining a larger radius. Further, the deformed material 46a is not flared outwardly, but instead remains generally within a boundary defined by an outer surface of the first tube section 34a. Concurrently, the end portion 42a of the second tube section 36a includes deformed material 48a defining a smaller radius. The deformed portion 48a is flared inwardly inside of a tubular boundary 44a, such as at a minimum angle of about 12° (FIG. 14).

Figure 15:
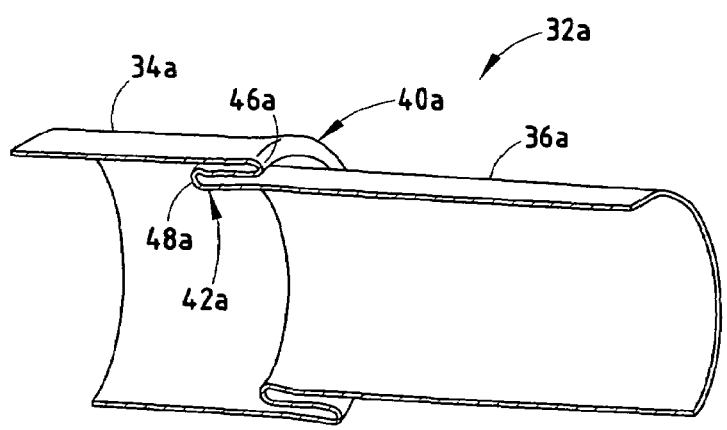
FIG. 15 is a sectional perspective view of the tube shown in FIG. 14, the tube being partially telescopingly collapsed.

FIG. 15 shows a partial stroke impact where a section of material from the first tube section 34a of tube 32a has rolled (in tube 32, the second smaller tube section 36 is the one that rolls during an impact as it rolls in a similar manner).

Figure 12:
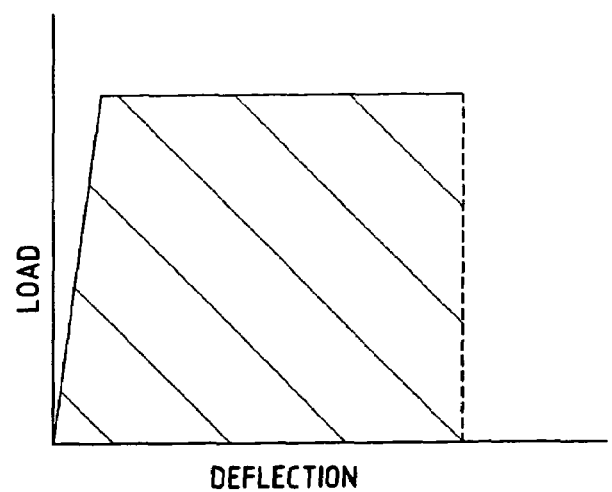
FIG. 12 is a graphical diagram of the load versus deflection characteristics of the energy management device of FIG. 3.

FIG. 12 illustrates a typical load-versus-deflection curve for tubes 32 and 32a. It will be apparent to a person skilled in the art that the load quickly comes up to a predetermined level, and stays relatively consistently at the selected level throughout the impact stroke. The area under the load deflection curve represents actual energy absorption ("AEA") during an impact stroke. A perfect energy absorption ("PEA") would be calculated by multiplying the maximum load achieved during an impact (LOAD) times the full impact stroke (L). The present energy management system provides an exceptionally high efficiency rating (i.e. "AEA" divided by "PEA"). Specifically, the present energy management tube technology ends up with much higher and more consistent energy-absorption efficiency rating than known crush towers, due to a relatively fast initial loading, and a relatively well-maintained and consistent level of loading continued through the entire impact stroke. Specifically, the present inventive concepts provide surprising and unexpected consistency and reliability of the load-versus-deflection curves, and also provide for consistent and reliable energy absorption and crush strokes.

Figure 16:
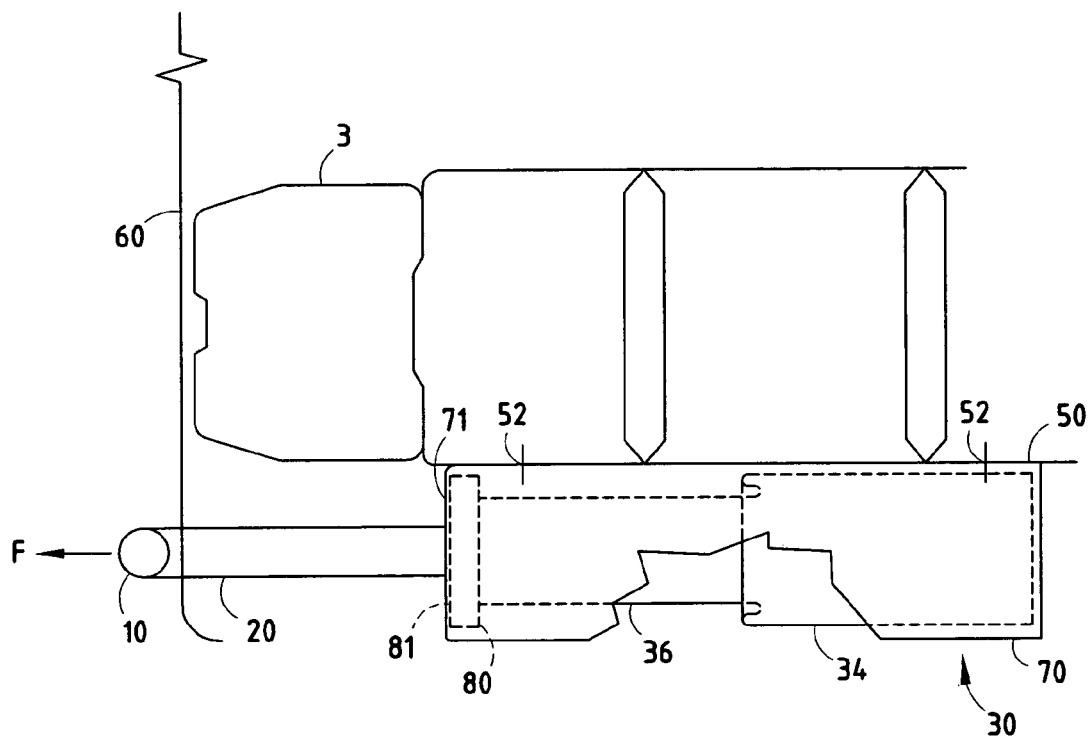
FIG. 16 is a partial sectional plan view of the tow hook and energy management device of FIG. 3 mounted to a vehicle frame, the energy management device shown with a cutaway section.

In use then, energy management device 30 includes an outer housing 70 which is operably connected to frame rail 50. In one embodiment (FIGS. 16 and 17), outer housing 70 is bolted to frame rail 50 at locations 52. However, this is only an exemplary embodiment and other methods of attachments may be used. When receiver 10 is used to pull or tow the vehicle, a force is applied in a generally first direction F. This force is transmitted through shaft 20 and directly to frame rail 50. This is because shaft 20 is rigidly affixed to a first end 81 of ring section 80 thereby transferring the force to a first wall 71 of housing 70 which in turn transfers the force from the outer housing 70 through locations 52 to frame rail 50. Therefore, when towing apparatus 2 is utilized to pull a vehicle in a direction F, first tube section 34 and second tube section 36 of energy management device 30 are isolated from this force due to ring section 80 transferring the tow force through the outer housing 70 directly to the frame rail 50. Alternatively, when a force is applied to receiver 10 in a direction opposite to the direction of towing (−F), first and second tube sections 34 and 36 of energy management device 30 are not isolated from this force.

Figure 17:
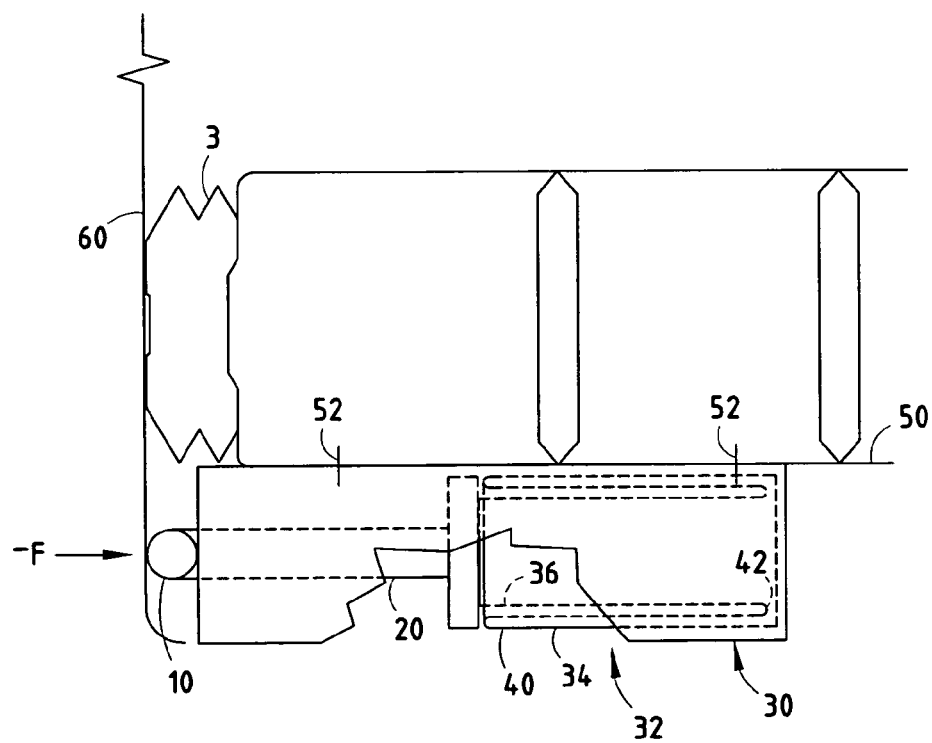
FIG. 17 is a partial sectional plan view of the tow hook and energy management device of FIG. 3 mounted to a vehicle frame in a compressed state, the energy management device shown with a cutaway section.
Figure 18:
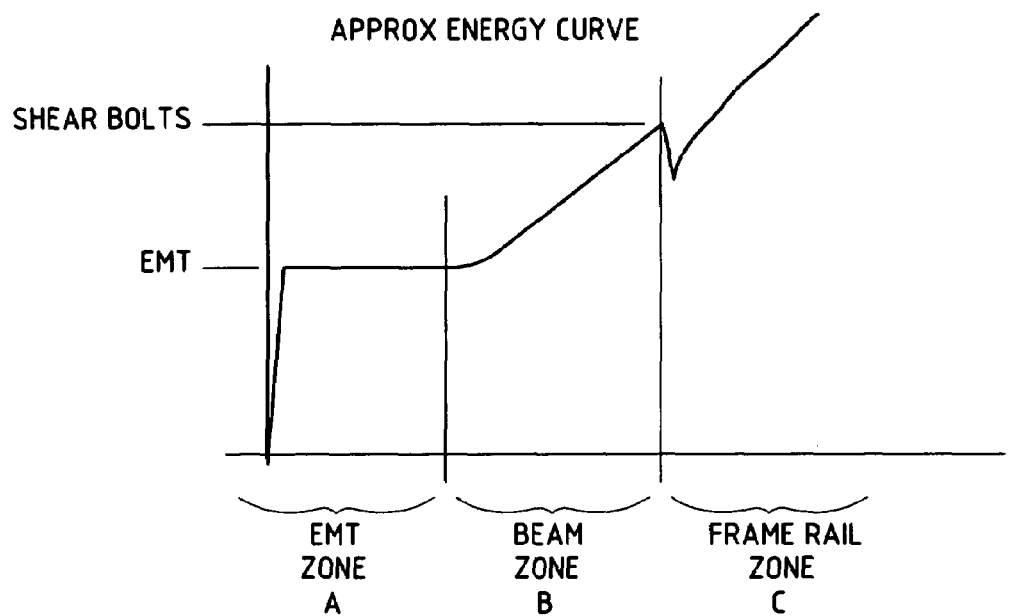
FIG. 18 is a graphical diagram of the energy curve of the energy management device of FIGS. 16 and 17.

With respect to FIG. 17, during an impact in a direction −F, at a specified and designed threshold, intermediate tube section 38, more specifically, second end portion 42 of intermediate tube section 38, will telescopingly yield, allowing second tube section 36 to telescopingly move within first tube section 34, thereby absorbing energy from the impact. This process is graphically illustrated in FIG. 18, whereby the initial force of impact as illustrated in zone A is seen to initially sharply rise up to a point which is tailored or designed into intermediate tube section 38. This initial yield point equals the amount of force required to initiate movement or deformation of energy management tube 32 and may be designed or tailored for specific applications. For example, the amount of force may be varied by utilizing different materials, different thicknesses of material, different shapes and different transition zones. However, other methods and materials may be used and these examples are not meant to be limiting.

Once this specified load value is reached, second end portion 42 of intermediate tube 38 telescopingly deforms, thereby reducing the force which is transmitted to the frame rail in a linear manner. This relatively constant reduction of force decreases the stresses which are transferred to the frame rail and subsequently to the occupants of the vehicle. If the vehicle is involved in a higher force impact, second end portion 42 of intermediate portion 38 will be fully deformed. At full deformation, energy management device 30 can be designed to transfer all remaining force to frame rail 50 or designed so that energy management device housing 70 can sustain deformation thereby further reducing the impact force. Alternatively, energy management device housing 70 may be designed to be fully removed or tear away from frame rail 50 at a specified load. If the forces are transferred to frame rail 50, after full deformation of management tube 32, the forces will no longer be dampered and will be transferred directly through locations 52 to frame rail 50 as can be seen by sections B and C of FIG. 18. However, it is worth noting that if the energy management device is not used as it is in prior art towing apparatuses, the reduction of force displayed in zone A of FIG. 18 will not occur, allowing the higher forces of zones B and C to be initially transmitted to the vehicle and ultimately to the vehicles occupants.

Figure 19:
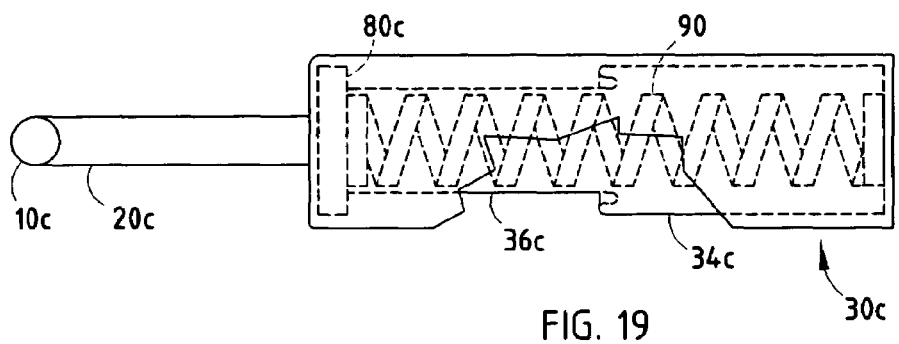
FIG. 19 is a partial sectional plan view of a second embodiment of the tow hook and energy management device embodying the present invention, the energy management device shown with a cutaway section.

A second embodiment is shown in FIG. 19, wherein the receiver 10c, shaft 20c and energy management device 30c are the same as in the first embodiment and include a first tube section 34c and a second tube section 36c. In addition, a compression spring 90 is disposed concentrically within first and second tube sections 34c and 36c. The deformation mechanics of second embodiment 30c are the same as the first embodiment except that compression spring 90 adds an additional mechanism for the reduction of force. The addition of spring 90 has the added feature of returning receiver 10c to its original position after an impact.

Figure 20:
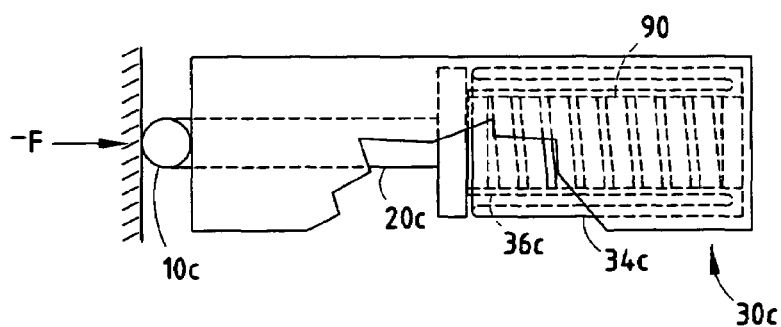
FIG. 20 is a partial sectional plan view of the tow hook and energy management device of FIG. 19 in a compressed state, the energy management device shown with a cutaway section.
Figure 21:
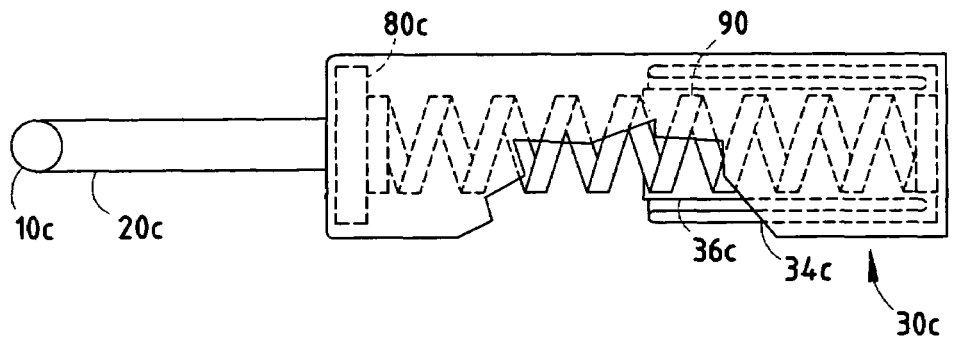
FIG. 21 is a partial sectional plan view of the tow hook and energy management device of FIG. 20 returned to an uncompressed state, the energy management device shown with a cutaway section.

As illustrated in FIG. 20, when receiver 10c is subjected to a force –F, second tube 36c will telescopingly collapse within first tube 34c as described previously. In addition, compression spring 90 will be compressed within second tube 36c. However, instead of rigidly affixing ring section 80 to an end of first tube section 34c, whereby receiver 10c would be maintained in this compressed/collapsed state, receiver 10c is not rigidly affixed to second tube 36c which allows compression spring 90 to return to its pre-collision state and returns receiver 10c to a forward or pre-impact state (FIG. 21).

Tow hooks are utilized when a vehicle is incapacitated such as after a collision. However, after a collision where the tow hook has been subjected to the impact force, they are no longer readily accessible thereby defeating their purpose. By utilizing compression spring 90, the receiver is no longer retained in a post-impact state but is returned to a more forward and more accessible location.

Figure 22:
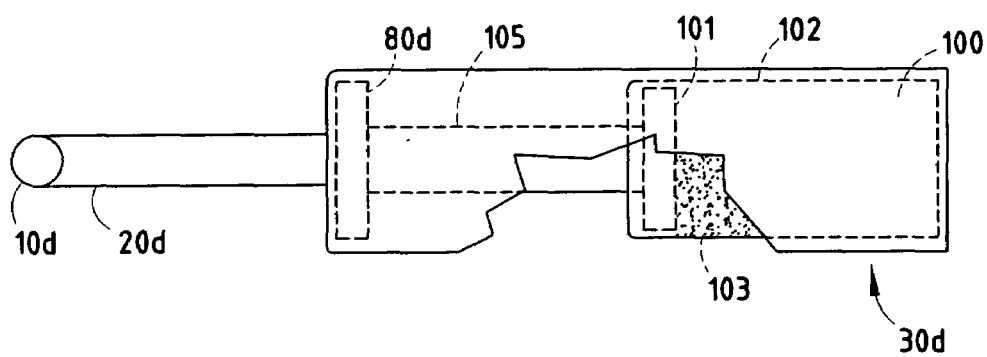
FIG. 22 is a partial sectional plan view of a third embodiment of the tow hook and energy management device embodying the present invention, the energy management device shown with a cutaway section.

A third embodiment is illustrated in FIG. 22, wherein the force reducing feature of energy management device 30d is a dashpot 100. Dashpot 100 generally consists of a piston 101 which is telescopingly engaged within a cylinder 102 and are generally well known in the art. Additionally, a viscous fluid 103 may or may not be included within dashpot 100 to further effectuate the reduction of forces. Further, a compression spring (not shown) could also be utilized in this embodiment around shaft 105 affording this embodiment with the same features as described with regard to the second embodiment. Still further, a compression spring (not shown) could be included within cylinder 102 in place of or in addition to viscous fluid 103 and yet still further, the telescopingly deformable first and second tubes of the first embodiment may also be incorporated into this embodiment in various ways. These examples are not meant to be limiting and other force reducing materials, mechanisms and/or methods may also be used within energy management device 30 in order to reduce the forces on receiver 10d which are transferred to frame rail 50.

Figure 23:
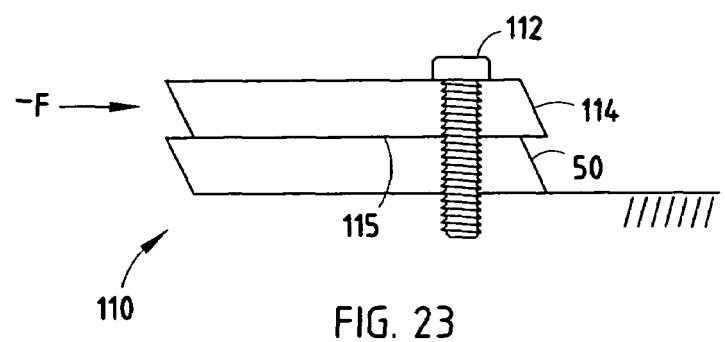
FIG. 23 is a sectional plan view of the tow hook and energy management device mounting bracket.

Finally, as illustrated in FIG. 23, a novel connection is illustrated which may be utilized to affix energy management tube 30 to a frame rail 50. Attachment device 110 includes at least one bolt 112 which attaches the energy management device (not shown) to frame rail 50 through a first plate 114. This configuration allows the force –F of an impact to be transmitted from the receiver to the energy management device and subsequently to first plate 114. The force –F is then reduced before being transmitted to frame rail 50 because of the frictional build-up on surface 115 between first plate 114 and frame rail 50 during, or in addition to, the shearing of the plurality of bolts 112 and thereby provides an additional energy absorption mechanism. This is accomplished because any force –F that is applied to first plate 114 will be transmitted through bolt 112 to frame rail 50. However, by having first plate 114 installed between the energy management device 30 and the frame rail 50, the force applied to first plate 114, and acting to shear bolt 112, will move first plate 114 relative to frame rail 50 creating a frictional force along surface 115 which will act to reduce the force transmitted to frame rail 50.

It is envisioned that in addition to protecting a vehicle frame from impacts, these energy management devices may also be utilized to prevent damaging forces which may inadvertently be applied to the vehicle frame during the towing operation, in the direction of the pull (F). For example, if a towing force exceeds a specified limit of the energy management device, the energy management device can be designed to yield before damage to the frame can occur. This will keep those forces from reaching the frame. This may be accomplished as described with regard to the first three embodiments except that instead of isolating the energy management device from the pull force, it is coupled to it. This could be accomplished, for example, by having energy management tube 32 connected directly to shaft 20 and/or receiver 10, allowing deformation of intermediate tube section 38 of energy management tube 32 before frame rail deformation occurs. Alternatively, a fully deformed energy management tube, as illustrated in FIG. 4, could be separately used to prevent this force from reaching the frame rail. This would allow the inner tube to telescopingly move forward, in the direction of tow, thereby reducing any errant force developed during the tow from being transmitted to the frame rail. Still further, the aforementioned features may be used separately or in combination to arrive at the desired apparatus whereby the towing force and the impact force may be managed concurrently within the same energy management device.

Thus, a towing apparatus with an energy absorbing device has been disclosed which reduces the impact force which is transmitted to the frame rail of a vehicle, thereby providing an additional safety measure to vehicle occupants. While exemplary embodiments have been described in detail, it is to be understood that variations and modifications can be made on the aforementioned structure without departing from the concept of the present invention, and further it is to be understood that such concepts are intended to be covered by the following claims, unless these claims by their language expressly state otherwise.

The invention claimed is:

1. A towing apparatus adapted for mounting to a frame of an automotive vehicle, comprising:
   a receiver adapted to receive a towing force; and
   an energy management device operably connected to said receiver and adapted for connection to a vehicle frame so that when the receiver is subjected to a first force in a first tow direction, the first tow force is directly transferred to the vehicle frame, and so that, when the receiver is subjected to a second force of predetermined magnitude in a second direction, said energy management device yields and reduces the second force to a reduced third force, which is in turn transferred to the vehicle frame, wherein said energy management device includes a compressible crush tower.

2. The towing apparatus of claim 1, wherein said receiver includes a hook.

3. The towing apparatus of claim 1, wherein said receiver includes a loop.

4. The towing apparatus of claim 1, wherein said energy management device includes a piston moving within a cylinder.

5. The towing apparatus of claim 4, wherein said energy management device further includes a spring.

6. The towing apparatus of claim 1, wherein said compressible crush tower includes a first tube concentrically aligned with a second tube;
   wherein a first end of the first tube is connected to a first end of the second tube through an intermediate tube;
   wherein further a first and a second end portion of said intermediate tube are dissimilar in shape and said first end of said intermediate tube is connected to the first end of said first tube and the second end of said intermediate tube is connected to the first end of said second tube.

7. The towing apparatus of claim 1, wherein said energy management device includes a spring.

8. The towing apparatus of claim 7, wherein said compressible crush tower includes a first tube concentrically aligned with a second tube;
   wherein a first end of the first tube is connected to a first end of the second tube through an intermediate tube;
   wherein further a first and a second end portion of said intermediate tube are dissimilar in shape and said first end of said intermediate tube is connected to the first end of said first tube and the second end of said intermediate tube is connected to the first end of said second tube.

9. A towing apparatus adapted for mounting to a frame of a vehicle, comprising:
   a receiver;
   an energy damping device having a first end operably connected to said receiver and adapted for connection to a vehicle frame so that when the receiver is subjected to a first force of predetermined magnitude in a first direction, said energy damping device does not reduce the magnitude of the first force which is transmitted to the vehicle frame, and when the receiver is subjected to a second force in a second direction, said energy damping device does not reduce the second force transmitted to the vehicle frame, wherein said energy management device includes a compressible crush tower.

10. The towing apparatus of claim 9, wherein said receiver includes a hook.

11. The towing apparatus of claim 9, wherein said receiver includes a loop.

12. The towing apparatus of claim 9, wherein said energy management device includes a piston moving within a cylinder.

13. The towing apparatus of claim 12, wherein said cylinder is filled with a viscous fluid.

14. The towing apparatus of claim 9, wherein said compressible crush tower includes a first tube concentrically aligned with a second tube;
   wherein a first end of the first tube is connected to a first end of the second tube through an intermediate tube;
   wherein further a first and a second end portion of said intermediate tube are dissimilar in shape and said first end of said intermediate tube is connected to the first end of said first tube and the second end of said intermediate tube is connected to the first end of said second tube.

15. The towing apparatus of claim 9, wherein said energy management device includes a spring.

16. The towing apparatus of claim 15, wherein said compressible crush tower includes a first tube concentrically aligned with a second tube;
   wherein a first end of the first tube is connected to a first end of the second tube through an intermediate tube;
   wherein further a first and a second end portion of said intermediate tube are dissimilar in shape and said first end of said intermediate tube is connected to the first end of said first tube and the second end of said intermediate tube is connected to the first end of said second tube.

17. The towing apparatus of claim 9, wherein when the receiver is subjected to the first force of predetermined magnitude in the first direction, said energy damping device does not reduce the first force transmitted to the vehicle frame.

18. The apparatus defined in claim 9, wherein the device is made of material having a tensile strength of at least 80 ksi.

19. The apparatus defined in claim 9, wherein the device is made of material having a tensile strength of at least 120 ksi.

20. An apparatus comprising:
   a towing hook;
   a vehicle mount; and
   a crushable, collapsible energy management tube connecting the towing hook and the vehicle mount and that is constructed of a material adapted to consistently and predictably absorb energy via a telescoping collapse upon receiving an impact, wherein said energy management tube comprises a compressible crush tower configured to provide a first force of resistance when impacted in a first longitudinal direction defined by the tube and configured to provide a different second force of resistance when impacted in a second direction opposite the first direction.

21. The apparatus defined in claim 20, wherein the tube is made of material having a tensile strength of at least 80 ksi.

22. The apparatus defined in claim 20, wherein the tube is made of material having a tensile strength of at least 120 ksi.

23. The apparatus defined in claim 20, wherein the tube has a round cross section.

* * * * *